J. A. BOYCE.
Thill-Coupling.
No. 20,033.
Patented Apr. 27, 1858.
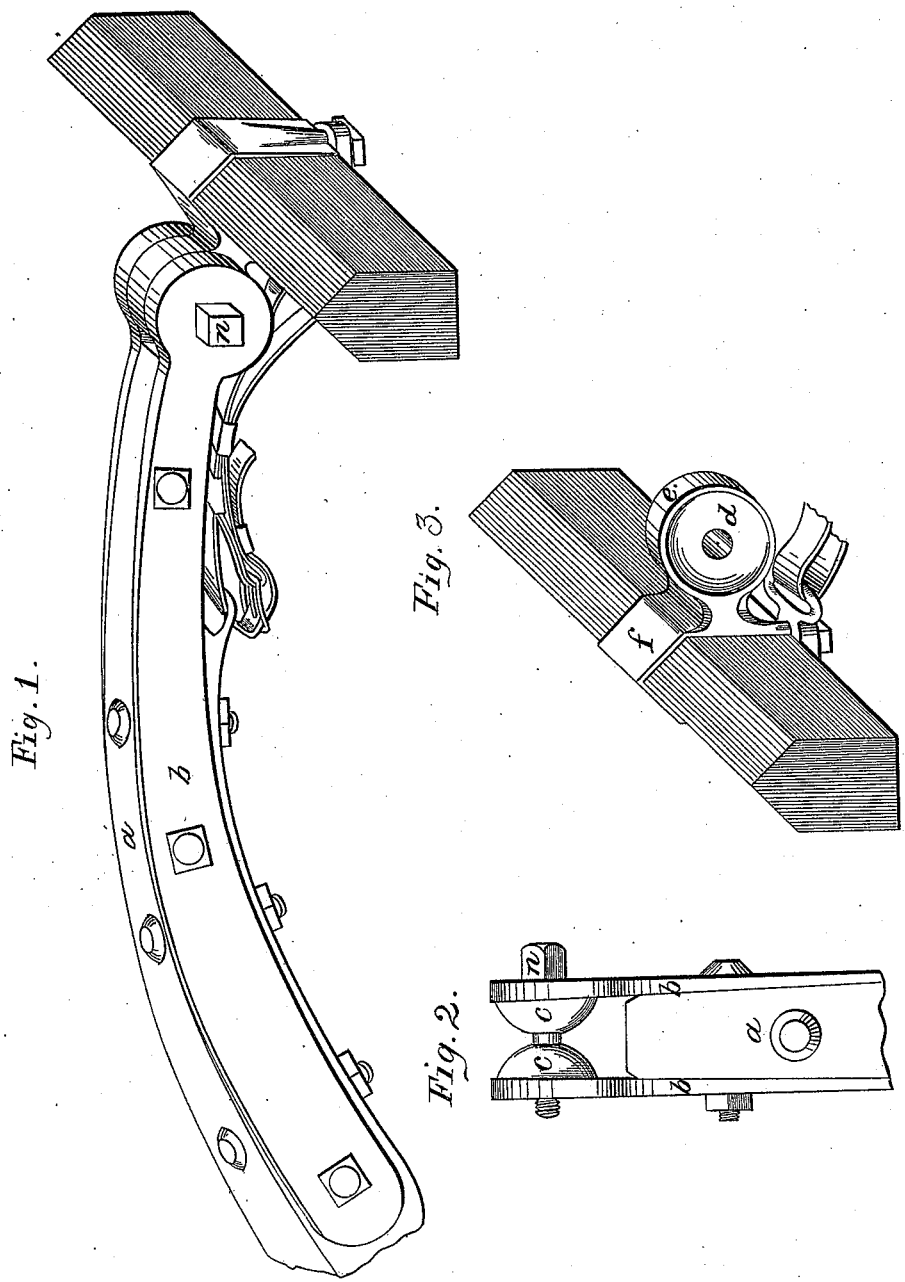

UNITED STATES PATENT OFFICE.

JNO. A. BOYCE, OF MONROE, NEW YORK.

ATTACHING SHAFTS TO VEHICLES.

Specification of Letters Patent No. 20,033, dated April 27, 1858.

*To all whom it may concern:*

Be it known that I, JOHN A. BOYCE, of Monroe, in the county of Orange and State of New York, have invented a new and Improved Mode of Attaching the Shafts or Poles of Carriages or other Vehicles to the Fore Axle; and I do hereby declare that the following is a full and exact description thereof, reference being had to the accompanying drawings, and to the letters of reference marked thereon, in which—

Figure 1, is a perspective view of the shaft and axle when connected together. Fig. 2, a view of the hinder end of the shaft, and parts of the fastenings attached thereto, and Fig. 3, a view of a portion of the axle with the clip attached.

The nature of my invention consists in a combination of fastenings, to secure the shafts or poles of carriages or other vehicles to the fore-axles, hereinafter more fully described.

To the hinder end of the shaft (*a*) see Figs. 1 and 2, two pieces of iron, or other suitable material, lettered (*b, b*) in the drawing, are attached on opposite sides of said shaft, by means of bolts and nuts or other suitable devices. The parts (*b, b*) are curved at their rear ends, and on their inner sides hemispherical, or other suitably formed projections are made, which fit accurately into depressions (*d, d*) in the double concave ring (*e*) Fig. 3, which forms a part of the clip (*f*) Fig. 3, the latter being attached to the axle in any ordinary manner. The depressions (*d, d*) in the double concave ring (*e*) may be lined with leather, india rubber, or other suitable material to form a tight joint. The centers of the ring (*e*) and curved portions of the pieces (*b, b*) are perforated, for the admission of a bolt (*n*), to one end of which a nut may be attached, if deemed necessary. By removing the bolts which connect the pieces (*b, b*) with the shaft, the latter may be easily removed, or when detached may readily be adjusted to its proper position. A tight joint is also formed which prevents the rattling noise so annoying to travelers, and should the bolt (*n*) by accident be broken, or removed from its place, the shaft would still remain attached to the clip, by reason of the hemispherical projections, (*c, c,*) bearing upon the depressions (*d, d*) in the double concave ring (*e*)—the bolts by which, the pieces (*b, b*) are attached to the shaft, binding said parts together.

It is well known that much annoyance and detention frequently arises, from the loss or breakage of a bolt, as used ordinarily, in connection with dead eyes, to connect the shaft and axle of carriages.

In my invention should the bolt be lost or broken, the shaft would still remain attached to the axle, by reason of the other attachment. While if the latter became inoperative, the former, or bolt fastening would preserve the connection between the shaft and axle; besides the strain upon the bolt is partially removed, by the other attachment, while the strain upon the latter is less in consequence of the bolt connection.

In fine my invention has for its object, the combination of the two fastenings (viz., the bolt attachment, and the hemispherical or other suitably formed projections, made to bear against corresponding depressions in the ring *e*) by which each is relieved of a portion of the strain which otherwise would bear upon it; if either attachment becomes inoperative, the other would maintain the connection between the shaft and axle, and a tight joint is formed to avoid the annoyance of rattling.

It is obvious that this device may be applied to connecting the poles of carriages to the axles. The pieces (*b, b*) might be attached to the clip also and the double concave ring attached to the hinder end of the shaft if deemed advisable.

What I claim as my invention and desire to secure by Letters Patent is—

Attaching the shafts, or poles, to the axles of carriages or other vehicles, by means of the combination of fastenings as described, viz. the bolt connection, and the projections (*c, c*) on the pieces (*b, b*), made to bear against the depressions (*d, d*) in the double concave ring (*e*), the whole being constructed and arranged in the manner and for the purpose set forth.

JOHN A. BOYCE.

Witnesses:
D. K. LYNCH,
GEORGE ROBERTS.